(12) United States Patent
Hsia

(10) Patent No.: US 10,237,946 B1
(45) Date of Patent: Mar. 19, 2019

(54) SOLID-STATE LIGHTING WITH STAND-ALONE TEST CAPABILITY FREE OF ELECTRIC SHOCK HAZARD

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/208,510

(22) Filed: Dec. 3, 2018

Related U.S. Application Data

(63) Continuation-in-part of application No. 16/154,707, filed on Oct. 8, 2018, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No.
(Continued)

(51) Int. Cl.
| | | |
|---|---|---|
| *H05B 33/08* | | (2006.01) |
| *H02J 7/00* | | (2006.01) |
| *H02J 7/02* | | (2016.01) |
| *H02M 1/44* | | (2007.01) |

(52) U.S. Cl.
CPC ........ *H05B 33/0887* (2013.01); *H02J 7/0068* (2013.01); *H02J 7/022* (2013.01); *H02M 1/44* (2013.01); *H05B 33/0815* (2013.01)

(58) Field of Classification Search
None
See application file for complete search history.

(56) References Cited

U.S. PATENT DOCUMENTS

| | | | | |
|---|---|---|---|---|
| 5,631,814 A | * | 5/1997 | Zak | ......................... H02J 9/061 |
| | | | | 307/66 |
| 6,330,176 B1 | * | 12/2001 | Thrap | ..................... H02J 3/005 |
| | | | | 307/86 |

(Continued)

*Primary Examiner* — Minh D A
*Assistant Examiner* — James H Cho
(74) *Attorney, Agent, or Firm* — Han IP PLLC; Andy M. Han

(57) ABSTRACT

An LED luminaire comprises a rechargeable battery, LED array(s), multiple driving circuits, a built-in test switch, and a voltage pull-down circuit. The multiple driving circuits comprise a charging circuit configured to charge the rechargeable battery, a first driving circuit configured to convert a DC voltage from the rechargeable battery to light up the LED array(s) when a line voltage from the AC mains is unavailable, and a second driving circuit configured to operate the LED array(s) when the line voltage from the AC mains is available. The built-in test switch and the voltage pull-down circuit are configured to enable or disable the first and the second driving circuits in proper situations and to meet regulatory test requirements without operational ambiguity and safety issues. Furthermore, the charging circuit and the second driving circuit are electrically isolated, no electric shock hazard possibly occurred.

20 Claims, 4 Drawing Sheets

Related U.S. Application Data

15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 6,795,322 B2 * | 9/2004 | Aihara | H02J 9/061 307/64 |
| 7,550,873 B2 * | 6/2009 | Jiang | H02J 9/061 307/64 |
| 2013/0127362 A1 * | 5/2013 | Trainor | H02J 9/065 315/224 |

* cited by examiner

SOLID-STATE LIGHTING WITH STAND-ALONE TEST CAPABILITY FREE OF ELECTRIC SHOCK HAZARD

CROSS-REFERENCE TO RELATED APPLICATIONS

The present disclosure is part of a continuation-in-part (CIP) application of U.S. patent application Ser. No. 16/154,707, filed 8 Oct. 2018, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with a stand-alone test capability, auto-selected for operations with a line voltage from alternate-current (AC) mains or a direct-current (DC) voltage from a rechargeable battery without electric shock hazard and ambiguity.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested for 30 seconds once a month and at least 90 minutes once a year to ensure they are in proper working conditions at all times. It is, therefore, a motive to design an LED lamp or an LED luminaire with a test and voltage pull-down circuit that integrates a built-in test switch such that after installed on a ceiling or in a room, such LED lamp or the LED luminaire can be individually tested for 30 seconds on site or many of such LED lamps or the LED luminaires be tested all at once as AC power is interrupted for at least 90 minutes, deactivating all the circuits each unit is connected to.

SUMMARY

An LED luminaire comprising at least four electrical conductors, one or more LED arrays, a rechargeable battery, a first full-wave rectifier and at least one second full-wave rectifier coupled to the at least four electrical conductors, a first input filter and a second input filter, a charging circuit, a first driver, a second driver, and a test and voltage pull-down circuit is used to replace a fluorescent or a conventional LED luminaire in luminaire fixture sockets connected to the AC mains. The at least four electrical conductors are configured to connect to the luminaire fixture sockets to receive a line voltage from the AC mains. The first full-wave rectifier and the at least one second full-wave rectifier are configured to respectively convert the line voltage from the AC mains into a first DC voltage and a second DC voltage. The first input filter and the second input filter configured to suppress electromagnetic interference (EMI) noise are respectively coupled to the first full-wave rectifier and the at least one second full-wave rectifier. The charging circuit comprises a first transformer and a first ground reference. The charging circuit is coupled to the first full-wave rectifier via the first input filter and configured to convert the first DC voltage into a third DC voltage that charges the rechargeable battery to reach a fourth DC voltage. The charging circuit is a step-down converter with the third DC voltage lower than the first DC voltage but higher than the fourth DC voltage.

The first driver comprises a switch, a dimming controllable device, an input inductor, at least one diode connected in series with the input inductor, an output resistor, and an output capacitor connected in parallel with the output resistor and connected between the at least one diode and the first ground reference. The first driver is configured to receive the fourth DC voltage from the rechargeable battery and to convert the fourth DC voltage into a fifth DC voltage to light up the one or more LED arrays when the line voltage from the AC mains is unavailable. The second driver comprises a second transformer, a power sustaining device, and a second ground reference and is coupled to the at least one second full-wave rectifier via the second input filter. The second driver is configured to convert the second DC voltage into a sixth DC voltage that powers up the one or more LED arrays at full power and to meet LED luminaire efficacy requirements when the power sustaining device is enabled to reach an operating voltage to operate the second driver.

The test and voltage pull-down circuit comprises a voltage pull-down circuit configured to either shut down the first driver by pulling down a dimming voltage coupled to the dimming controllable device when the line voltage from the AC mains is available or to enable the first driver by pulling up the dimming voltage coupled to the dimming controllable device when the line voltage from the AC mains is unavailable. Simply put, all of the charging circuit, the first driver, the second driver, and the test and voltage pull-down circuit are configured to auto-select either the fifth DC voltage or the sixth DC voltage to operate the one or more LED arrays. When a rechargeable battery test is performed, the first driver is enabled to operate the one or more LED arrays, whereas the second driver is inactivated, The voltage pull-down circuit comprises a first voltage pull-down circuit comprising an electronic switch and a pull-down resistor connected to the electronic switch. When the first voltage pull-down circuit receives both the third DC voltage and the fourth DC voltage while the line voltage from the AC mains is available, the electronic switch is turned on, thereby pulling down the dimming voltage and disabling the first driver. When the line voltage from the AC mains is unavailable, the first voltage pull-down circuit receives the fourth DC voltage alone, and the electronic switch is turned off, thereby pulling up the dimming voltage and enabling the first driver. The voltage pull-down circuit further comprises a test switch normally open. The test switch is configured to pull down an input voltage to the electronic switch when momentarily pressed to be closed. When the rechargeable battery test is performed with the test switch closed, the input voltage is pulled down with the electronic switch being turned off.

The charging circuit further comprises a first diode connected to a secondary winding of the first transformer. The test and voltage pull-down circuit comprises at least one second diode connected in series with the first diode. The at least one second diode is further connected to the rechargeable battery, a power input of the dimming controllable device, and the test and voltage pull-down circuit. The first diode is further coupled to the first voltage pull-down circuit. The first diode and the at least one second diode are configured to control a current direction to charge the rechargeable battery, to set up a voltage drop from the third DC voltage to the fourth DC voltage, and to prevent the fourth DC voltage from being messed up with the third DC voltage when the line voltage from the AC mains is unavailable. In other words, the third DC voltage is always greater than the fourth DC voltage when the charging circuit is active as the line voltage from the AC mains is available. Only when the line voltage from the AC mains is unavailable, is the fourth DC voltage greater than the third DC voltage, which is a zero voltage because the charging circuit cannot be operated without power. The first voltage pull-down circuit is so designed to distinguish such a difference and to turn the electronic switch on or off, controlling the dimming voltage accordingly.

The test and voltage pull-down circuit further comprises a second voltage pull-down circuit comprising the second ground reference. The second voltage pull-down circuit, connected to the power sustaining device in the second driver, is configured to disable the second driver by pulling down the operating voltage on the power sustaining device to the second ground reference when the rechargeable battery test is performed. The second voltage pull-down circuit is essential to disable the second driver when the first driver is enabled. In other words, if the second voltage pull-down circuit does not exist, the one or more LED arrays will receive two sets of driving current from both the first driver and the second driver. In this case, when the rechargeable battery test is performed, the second driver powered by the line voltage from the AC mains will dominate to drive the one or more LED arrays rather than the first driver powered by the rechargeable battery to light up the one or more LED arrays. If this is the case, the rechargeable battery test is meaningless. The test and voltage pull-down circuit further comprises at least one pair of electrical contacts configured to electrically couple the rechargeable battery to the charging circuit, the first driver, and the test and voltage pull-down circuit and to operate thereof. The electrical contacts may comprise electrical contacts in a switch, a relay, and a jumper, or electrical terminals accommodated for jumper wires.

The test and voltage pull-down circuit further comprises a detection circuit comprising a precision voltage regulator, a series of voltage dividers coupled to the precision voltage regulator, one or more operational amplifiers, and one or more LED indicators. The precision voltage regulator and the series of the voltage dividers are configured to provide voltage references for the one or more operational amplifiers to test the fourth DC voltage and to identify operational statuses. The series of the voltage dividers comprises one or more resistors connected in series. At least one of the voltage references is configured for one of the one or more operational amplifiers to identify if charging of the rechargeable battery is normal. At least one of the one or more LED indicators is configured to be lighted up to indicate such a normal status. The at least one of the one or more LED indicators is further configured to be shut off to indicate that the rechargeable battery is fully charged. At least another one of the voltage references is configured for another one of the one or more operational amplifiers to identify if charging of the rechargeable battery is abnormal. At least another one of the one or more LED indicators is configured to be lighted up to indicate such an abnormal status.

The charging circuit further comprises a first input and a first output electrically isolated from the first input by the first transformer. The first output is coupled to the first ground reference. Similarly, the second driver further comprises a second input, a second output electrically isolated from the second input by the second transformer, and a second ground reference. The second output is coupled to the second ground reference. Two different ground references are so designed to ensure no coupling between the charging circuit and the second driver. In this case, a return current from the one or more LED arrays can correctly reach the first ground reference when the first driver powers up the one or more LED arrays or reach the second ground reference when the second driver powers up the one or more LED arrays, completing energy transfer to the one or more LED arrays without an electric shock hazard.

The first driver is a step-up converter with the fifth DC voltage higher than both the fourth DC voltage and a forward voltage across the one or more LED arrays to operate the one or more LED arrays without flickering. The first driver further comprises one or more current sensing resistors coupled in series with the switch in the first driver. The switch and the one or more current sensing resistors are configured to control charging and discharging of the input inductor, subsequently controlling an output current to operate the one or more LED arrays such that the one or more LED arrays consume less power when the line voltage from the AC mains is unavailable than the one or more LED arrays do when the line voltage from the AC mains is available.

The charging circuit is a first step-down converter with the third DC voltage lower than the first DC voltage but higher than the fourth DC voltage, as mentioned above. The second driver is a second step-down converter with the sixth DC voltage lower than the second DC voltage but higher than the forward voltage across the one or more LED arrays. The second step-down converter is configured to operate the one or more LED arrays at full power.

The at least four electrical conductors may comprise a first set of electrical conductors and a second set of electrical conductors. Each of the first full-wave rectifier and the at least one second full-wave rectifier is respectively coupled to the first set of electrical conductors and the second set of electrical conductors. When only one of the first full-wave rectifier or the at least one second full-wave rectifier is energized by the line voltage from the AC mains connected to one of the first set of electrical conductors and the second set of electrical conductors, the other one of the first set of electrical conductors and the second set of electrical conductors do not conduct electric current, thus no electric shock hazard possibly occurred. Besides, the first set of electrical conductors and the second set of electrical conductors may respectively be connected to an unswitched and a switched line voltage from the AC mains, further controlled by different circuit breakers, such that the charging circuit is coupled to the unswitched line voltage from the AC mains to charge the rechargeable battery all the time no matter whether the line voltage from the AC mains is switched off at night.

The first driver is coupled to the one or more LED arrays via at least one third diode and the input inductor. When the one or more LED arrays receive a driving current from the first driver, a current returned from the one or more LED arrays can only flow to the first ground reference connected to the first driver, completing a power transfer from the rechargeable battery. The second driver is also coupled to the one or more LED arrays via at least one fourth diode. When the one or more LED arrays receive a driving current from the second driver, a current returned from the one or more LED arrays can only flow back to the second ground reference connected to the second driver, completing a power transfer from the AC mains. Such phenomena show that no coupling exists between the charging circuit and the second driver, thus no electric shock hazard possibly occurred.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
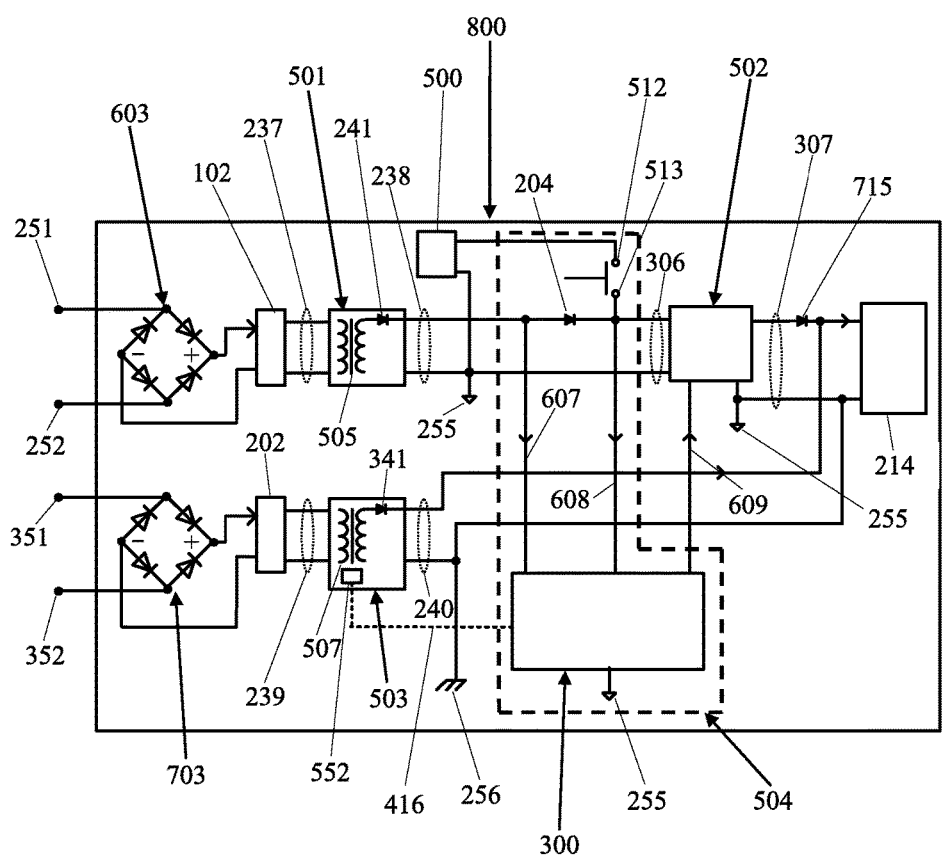
FIG. 1 is a block diagram of an LED luminaire with a stand-alone test capability, auto-selected for operations with a line voltage from the AC mains or a DC voltage from a rechargeable battery according to the present disclosure.

FIG. 1 is a block diagram of an LED luminaire 800 with a stand-alone test capability, auto-selected for operations with a line voltage from the AC mains or a DC voltage from a rechargeable battery according to the present disclosure. The LED luminaire 800 comprises one or more LED arrays 214; at least four electrical conductors 251, 252, 351, and 352; a first full-wave rectifier 603 connected to the two electrical conductors 251 and 252; at least one second full-wave rectifier 703 connected to the two electrical conductors 351 and 352; a rechargeable battery 500; a first input filter 102 and a second input filter 202, each configured to suppress EMI noise; a charging circuit 501; a first driver 502; a second driver 503; and a test and voltage pull-down circuit 504. The first full-wave rectifier 603 and the at least one second full-wave rectifier 703 are configured to respectively convert a line voltage from the AC mains into a first DC voltage and a second DC voltage. The charging circuit 501 comprises a first transformer 505, a first input 237, a first output 238, and a first ground reference 255. The charging circuit 501 is coupled to the first full-wave rectifier 603 via the first input filter 102 whereas the second driver 503 is coupled to the at least one second full-wave rectifier 703 via the second input filter 202. The charging circuit 501 is configured to convert the first DC voltage into a third DC voltage for charging the rechargeable battery 500 to reach a fourth DC voltage. The charging circuit 501 further comprises a first diode 241 connected to a secondary winding of the first transformer 505. The first diode 241 is configured to rectify an output current from the charging circuit 501 and to control a current direction. The first driver 502 comprises a third input 306 and a third output 307. The first driver 502 is configured to receive the fourth DC voltage from the rechargeable battery 500 and to convert the fourth DC voltage into a fifth DC voltage to operate the one or more LED arrays 214. The second driver 503 comprises a second transformer 507, a second input 239, a second output 240, and a second ground reference 256 electrically isolated from the first ground reference 255. The second driver 503 is configured to convert the second DC voltage into a sixth DC voltage for powering up the one or more LED arrays 214 at full power and to meet LED luminaire efficacy requirements when the line voltage from the AC mains is available.

In FIG. 1, the test and voltage pull-down circuit 504 comprises at least one pair of electrical contacts 512 and 513, a voltage pull-down circuit 300, and at least one second diode 204. The voltage pull-down circuit 300 comprises the first ground reference 255, same as the first driver 502 and the charging circuit 501, to ensure a reliable current return among the first output 238, the voltage pull-down circuit 300, and the first driver 502. The at least one pair of the electrical contacts 512 and 513 are configured to make a connection to electrically couple the rechargeable battery 500 to the charging circuit 501, the first driver 502, and the voltage pull-down circuit 300 and to operate thereof. In other words, the at least one pair of the electrical contacts 512 and 513 must be electrically connected so that the rechargeable battery 500 can receive energy from the charging circuit 501 via the at least one second diode 204 whereas the voltage pull-down circuit 300 can receive a bias voltage across the at least one second diode 204 via control connections 607 and 608 either to operate or to deactivate the first driver 502 after processing. When the LED luminaire 800 is intended not to be operated, for example, in a shipment, if the at least one pair of the electrical contacts 512 and 513 do not exist, the rechargeable battery 500 will automatically power on the first driver 502 to operate the one or more LED arrays 214. This kind of non-intended operation with the rechargeable battery 500 discharged may create safety issues and must be prevented from occurring by disconnecting the at least one pair of the electrical contacts 512 and 513. On the other hand, when the LED luminaire 800 is in use, the at least one pair of the electrical contacts 512 and 513 are always electrically connected (as is the case hereinafter unless otherwise specified). The electrical contacts 512 and 513 may comprise electrical contacts in a switch, in a relay, and in a jumper, or electrical terminals accommodated for jumper wires.

In FIG. 1, the test and voltage pull-down circuit 504 is partly coupled between the charging circuit 501 and the first driver 502 and is configured to send a dimming voltage, which is bi-level, via a control connection 609 to either shut down the first driver 502 when the line voltage from the AC mains is available or enable the first driver 502 when the line voltage from the AC mains is unavailable. When the first driver 502 is enabled, the one or more LED arrays 214 are driven by the second driver 502 via a third diode 715. The third diode 715 is configured to control an output current from the third output 307 to flow into the one or more LED arrays 214 but to block any electric current backward flowing. In this case, the electric current returned from the one or more LED arrays 214 must go to the first ground reference 255 to complete the power transfer. When the first driver 502 is disabled, the one or more LED arrays 214 are driven by the second driver 503 via the second output 240 of the second driver 503. The second driver 503 further comprises at least one fourth diode 341 configured to rectify an output current from the second driver 503 and to control the output current in a direction to flow into the one or more LED arrays 214 but to block any electric current backward flowing. In this case, the electric current returned from the one or more LED arrays 214 must go to the second ground reference 256 to complete the power transfer.

The at least one second diode 204 in the test and voltage pull-down circuit 504 is further connected to the rechargeable battery 500, a power input of the dimming controllable device 710 (in FIG. 2), and the voltage pull-down circuit 300. The first diode 241 is further coupled to the voltage pull-down circuit 300. The first diode 241 and the at least one second diode 204 are configured to control a current direction to charge the rechargeable battery 500, to set up a voltage drop from the third DC voltage to the fourth DC voltage, and to prevent the fourth DC voltage from being messed up with the third DC voltage when the line voltage from the AC mains is unavailable. In other words, the third DC voltage is always greater than the fourth DC voltage when the charging circuit 501 is active as the line voltage from the AC mains is available. Only when the line voltage from the AC mains is unavailable, is the fourth DC voltage greater than the third DC voltage, which is a zero voltage because the charging circuit 501 cannot be operated without power. The voltage pull-down circuit 300 is so designed to distinguish such a difference and to control the dimming voltage accordingly. When the line voltage from the AC mains is available, the charging circuit 501 is active, and the voltage pull-down circuit 300 respectively receives the third DC voltage and the fourth DC voltage via the control connections 607 and 608 to disable the first driver 502. When the line voltage from the AC mains is unavailable, the charging circuit 501 is inactive, and the voltage pull-down circuit 300 receives only the fourth DC voltage via the control connection 608 to enable the first driver 502 that is already energized by the rechargeable battery 500. Once receiving an enable signal, the first driver 502 converts the fourth DC voltage into the fifth DC voltage to operate the one or more LED arrays 214.

In FIG. 1, the first transformer 505 in the charging circuit 501 is configured to electrically isolate the first input 237 from the first output 238. The first output 238 is coupled to the first ground reference 255. Similarly, the second transformer 507 in the second driver 503 is configured to electrically isolate the second input 239 from the second output 240 relative to the second ground reference 256. In FIG. 1, the second driver 503 further comprises a power sustaining device 552. The power sustaining device 552 is configured to receive a control signal from the voltage pull-down circuit 300 to enable or disable the second driver 503. Two ground references are so designed to ensure no power coupling between the charging circuit 501 and the second driver 503. In this case, a return current from the one or more LED arrays 214 can correctly reach the first ground reference 255 when the first driver 502 powers up the one or more LED arrays 214 or reach the second ground reference 256 when the second driver 503 powers up the one or more LED arrays 214, completing each energy transfer to the one or more LED arrays 214 without an electric shock hazard. Nevertheless, the test and voltage pull-down circuit 504 and the first driver 502 have the same ground reference 255 so that the test and voltage pull-down circuit 504 can control the first driver 502 by using the dimming voltage. In FIG. 1, the charging circuit 501 is a step-down converter with the third DC voltage lower than the first DC voltage but higher than a rated voltage of the rechargeable battery 500. The second driver 503 is also a step-down converter with the sixth DC voltage lower than the second DC voltage but higher than the forward voltage across the one or more LED arrays 214 to operate the one or more LED arrays 214 at full power.

Figure 2:
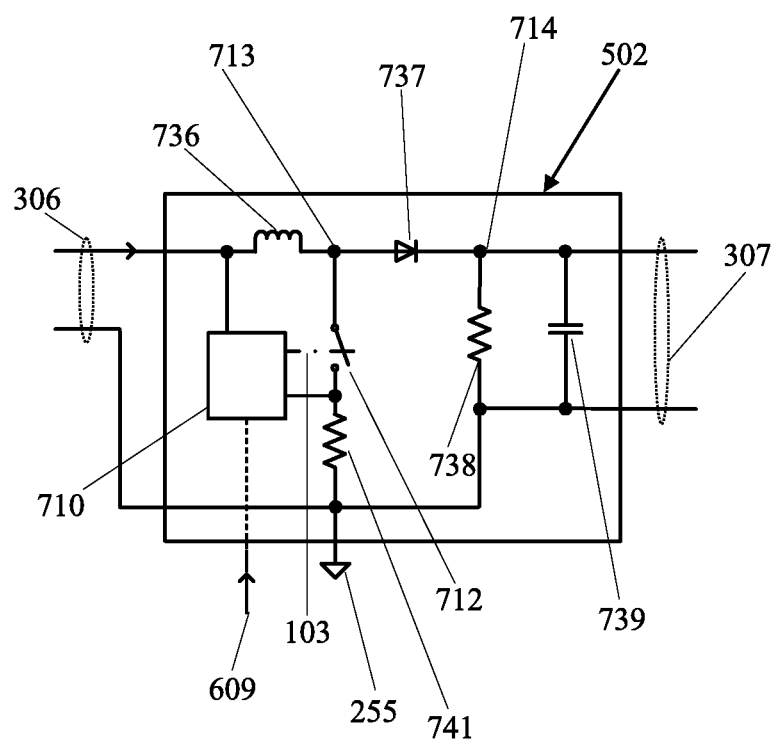
FIG. 2 is an embodiment of a first driver according to the present disclosure.

FIG. 2 is an embodiment of the first driver according to the present disclosure. In FIG. 2, the first driver 502 comprises the third input 306 connected to the rechargeable battery 500 and the at least one diode 204, the third output 307 connected to the one or more LED arrays 214 via the third diode 715 (in FIG. 1), a dimming controllable device 710, a switch 712 controlled by the dimming controllable device 710 via a link 103, an input inductor 736, a diode 737 connected in series with the input inductor 736 at a port 713, an output resistor 738, and an output capacitor 739 connected in parallel with the output resistor 738. The output resistor 738 and the output capacitor 739 are further connected between a port 714 of the diode 737 and the first ground reference 255. The first driver 502 is configured to receive the fourth DC voltage from the rechargeable battery 500 and to convert the fourth DC voltage into the fifth DC voltage to light up the one or more LED arrays 214 when the line voltage from the AC mains is unavailable. The dimming controllable device 710 receives the dimming voltage at the control connection 609 from the voltage pull-down circuit 300 (in FIG. 1). When the dimming voltage at the control connection 609 is a low-level voltage, the dimming controllable device 710 controls the switch 712 to be closed, which leads to a reverse bias across the diode 737, subsequently preventing the input inductor 736 from charging and discharging, thereby disabling the first driver 502 not to light up the one or more LED arrays 214. On the other hand, when the dimming voltage at the control connection 609 is a high-level voltage, the dimming controllable device 710 controls the switch 712 to be opened and closed in a pulse-width modulation fashion, which leads to an alternating forward bias and reverse bias across the diode 737, subsequently enabling the input inductor 736 to charge and discharge, thereby building up a proper output voltage from the first driver 502 to light up the one or more LED arrays 214. The third input 306 is connected to both the rechargeable battery 500 (FIG. 1) via the at least one pair of the electrical contacts 512 and 513 and the charging circuit 501 via the at least one second diode 204. When the line voltage from the AC mains is available, the charging circuit 501 operates not only to continuously charge the rechargeable battery 500 but also to provide an input power to the first driver 502 via the third input 306. Without the dimming voltage at the control connection 609 from the voltage pull-down circuit 300 to manage, the first driver 502 will always operate to power up the one or more LED arrays 214. In this case, the rechargeable battery 500 will never be fully charged because operating the first driver 502 and the one or more LED arrays 214 will drain energy from the rechargeable battery 500. Surely, such kind of operation fails to comply with regulatory requirements.

In FIG. 2, the first driver 502 further comprises one or more current sensing resistors 741 connected in series with the switch 712. The one or more current sensing resistors 741 are configured to control an output current to operate the one or more LED arrays 214 such that the one or more LED arrays 214 consume less power when the line voltage from the AC mains is unavailable than the one or more LED arrays 214 do when the line voltage from the AC mains is available. As mentioned above, the first driver 502 is a step-up converter in that the first driver 502 transmits power from the third input 306 to the third output 307 in a two-step process. The input inductor 736 is served as an energy storage element. When the switch 712 is closed, the input inductor 736 stores energy with the diode 737 reverse-biased to block any current from flowing to the one or more LED arrays 214. In this period, an output voltage is maintained by the output capacitor 739, which is not high enough to operate the one or more LED arrays 214. When the switch 712 is opened, the input inductor 736 reverses its polarity, leading a forward bias of the diode 737. Thus, the output current controlled by the one or more current sensing resistors 741 can flow out to replenish the output capacitor 739 and to boost an output voltage at the third output 307 greater than the input voltage at the third input 306.

Figure 3:
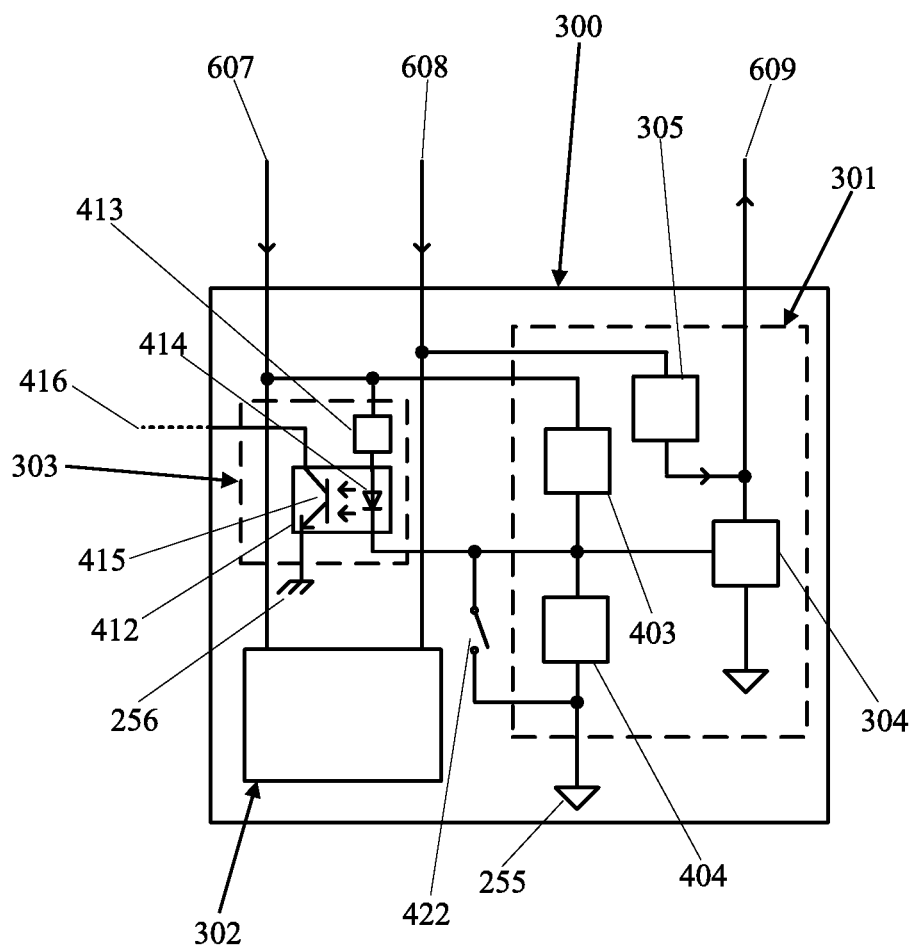
FIG. 3 is an embodiment of a voltage pull-down circuit according to the present disclosure.

FIG. 3 is an embodiment of the voltage pull-down circuit according to the present disclosure. In FIG. 3, the voltage pull-down circuit 300 comprises a first voltage pull-down circuit 301, a detection circuit 302, a test switch 422, and a second voltage pull-down circuit 303. The voltage pull-down circuit 300 is configured to either shut down the first driver 502 by pulling down the dimming voltage to the dimming controllable device 710 (in FIG. 2) via the control connection 609 when the line voltage from the AC mains is available or to enable the first driver 502 by pulling up the dimming voltage to the dimming controllable device 710 when the line voltage from the AC mains is unavailable. Simply put, all of the charging circuit 501, the first driver 502, the second driver 503, and the test and voltage pull-down circuit 504 are configured to auto-select either the fifth DC voltage or the sixth DC voltage to operate the one or more LED arrays 214.

In FIG. 3, the first voltage pull-down circuit 301 comprises an electronic switch 304, a first pull-down resistor 305, and a second pull-down resistor 403. The first voltage pull-down circuit 301 receives both the third DC voltage and the fourth DC voltage respectively from an input and an output voltage of the at least one second diode 204 via the control connections 607 and 608, wherein when the line voltage from the AC mains is available, the electronic switch 304 is turned on, thereby pulling down the dimming voltage via the control connection 609 to disable the first driver 502. When the line voltage from the AC mains is unavailable, the electronic switch 304 receives only the fourth DC voltage and is turned off to pull up the dimming voltage via the control connection 609 to enable the first driver 502.

As depicted in FIG. 1, the at least one second diode 204 is electrically coupled between the charging circuit 501 and the first driver 502. The first diode 241 in the charging circuit 501 is connected to the secondary winding of the first transformer 505. The at least one second diode 204 is connected in series with the first diode 241. The at least one second diode 204 is further connected to the rechargeable battery 500, a power input of the dimming controllable device 710 (FIG. 2), and the voltage pull-down circuit 300. The first diode 241 is further coupled to the first voltage pull-down circuit 301. The first diode 241 and the at least one second diode 204 are configured to control charging of the rechargeable battery 500, to set up a voltage drop from the third DC voltage to the fourth DC voltage, and to prevent the fourth DC voltage from being messed up with the third DC voltage when the line voltage from the AC mains is unavailable. Because the voltage drop exists between the two ends of the at least one second diode 204, the third DC voltage is always greater than the fourth DC voltage when the charging circuit 501 is active as the line voltage from the AC mains is available. Only when the line voltage from the AC mains is unavailable, is the fourth DC voltage greater than the third DC voltage. The first voltage pull-down circuit 301 is so designed to distinguish such a difference and to turn the electronic switch 304 on or off, pulling down or pulling up the dimming voltage to the dimming controllable device 710 via the control connection 609.

In FIG. 3, the first voltage pull-down circuit 301 further comprises an input resistor 404 connected to the second pull-down resistor 403. The input resistor 404 and the second pull-down resistor 403 are configured to control an input voltage to the electronic switch 304. When the line voltage from the AC mains is unavailable, the second pull-down resistor 403 receives the third DC voltage via the control connection 607 from the first diode 241 (in FIG. 1) whereas the first pull-down resistor 305 continuously receives the fourth DC voltage via the control connection 608 from the at least one second diode 204. In this case, the input voltage divided by the input resistor 404 and the second pull-down resistor 403 turns on the electronic switch 304. The electronic switch 304 comprises a silicon-controlled rectifier (SCR), a transistor, a metal-oxide-semiconductor field-effect transistor (MOSFET), or various combinations thereof.

In FIG. 3, the second voltage pull-down circuit 303 comprising an opto-isolator 412, a third pull-down resistor 413, and the second ground reference 256. The opto-isolator 412 comprises an LED 414 and a photo-transistor 415. The second voltage pull-down circuit 303 is connected to the power sustaining device 552 (FIG. 1) in the second driver 503 via the control connection 416 in FIG. 1. The second voltage pull-down circuit 303 is configured to disable the second driver 503 by pulling down the operating voltage on the power sustaining device 552 to the second ground reference 256 when the rechargeable battery test is performed.

In FIG. 3, the test switch 422 is normally open. The test switch 422 is configured to pull down the input voltage to the electronic switch 304 when momentarily pressed to be closed. The test switch 422 is connected in parallel with the input resistor 404. When the rechargeable battery test is performed with the test switch 422 closed, the input voltage is pulled down with the electronic switch 304 being turned off, subsequently pulling up the dimming voltage to the driver 502. When the test switch 422 is closed, the LED 414 in the second voltage pull-down circuit 303 is enabled to allow electric current to flow from the first diode 241 (FIG. 1) via the control connection 607 and the third pull-down resistor 413 to the first ground reference 255. The LED 414 illuminates the photo-transistor 415, thereby turning on the photo-transistor 415. The photo-transistor 415 is connected between the power sustaining device 552 (via the control connection 416 in FIG. 1) and the second ground reference 256. When the photo-transistor 415 is turned on, a voltage on the power sustaining device 552 is pulled down to the second ground reference 256, thereby disabling the second driver 503.

As mentioned in related art above, a rechargeable battery test is required by codes of many cities. The rechargeable battery test of the LED luminaire 800 must be performed to ensure that the rechargeable battery 500, the charging circuit 501, and the first driver 502 are in a working condition at all times. The rechargeable battery test may be performed by turning off external circuit breakers that connect the line voltage from the AC mains to the LED luminaire 800, taking advantages of likely testing many units of the LED luminaire 800 installed in the same circuit breakers at the same time to save labor costs. In some cases, home owners want to individually perform such a test using a test switch (shown in FIG. 3). The test switch comprises two types: a high AC-voltage one and a low DC-voltage one. The high AC-voltage test switch must be installed outside the LED luminaire 800 to function like the circuit breakers. When the rechargeable battery test is performed, the high AC-voltage test switch is turned off to disconnect both the first set of the electrical conductors 251 and 252 and the second set of the electrical conductors 351 and 352 to reach the line voltage from the AC mains, no matter whether they are connected to the unswitched or the switched line voltage. The low DC-voltage test switch may be built in the LED luminaire 800 as a part of the test and voltage pull-down circuit 504 to enable the first driver 502 and to disable the second driver 503 when the rechargeable battery test is performed while the low DC-voltage test switch is pressed to function. The low DC-voltage test switch is normally open, meaning no electric current flow through it and no influence on the charging circuit 501, the first driver 502, the second driver 503, and the test and voltage pull-down circuit 504 in a normal operation. On the contrary, the high AC-voltage test switch is normally closed to operate the LED luminaire 800 in a normal mode. When the rechargeable battery test is performed, the high AC-voltage test switch is turned off to simulate a power outage. To choose an LED luminaire with the high AC-voltage test switch or the low DC-voltage test switch, consumers must notice that the low DC-voltage test switch is built-in, requiring no installation to save labor costs, whereas the high AC-voltage test switch needs a considerable retrofitting work to be installed on a luminaire fixture. It seems that the low DC-voltage test switch is preferable. For many units of the LED luminaire with the low DC-voltage test switch, the consumers can still adopt the circuit breakers to perform rechargeable battery test at the same time. In present disclosure, the test switch 422 is a type of the low DC-voltage test switch. That is to say that the LED luminaire 800 with a built-in test switch 422 has a stand-alone test capability with no need to install an external high AC-voltage test switch to perform the rechargeable battery test. By simply pressing the built-in test switch 422 and observing one or more LED arrays 214 to respond, the consumers know whether the rechargeable battery test is good or not.

Figure 4:
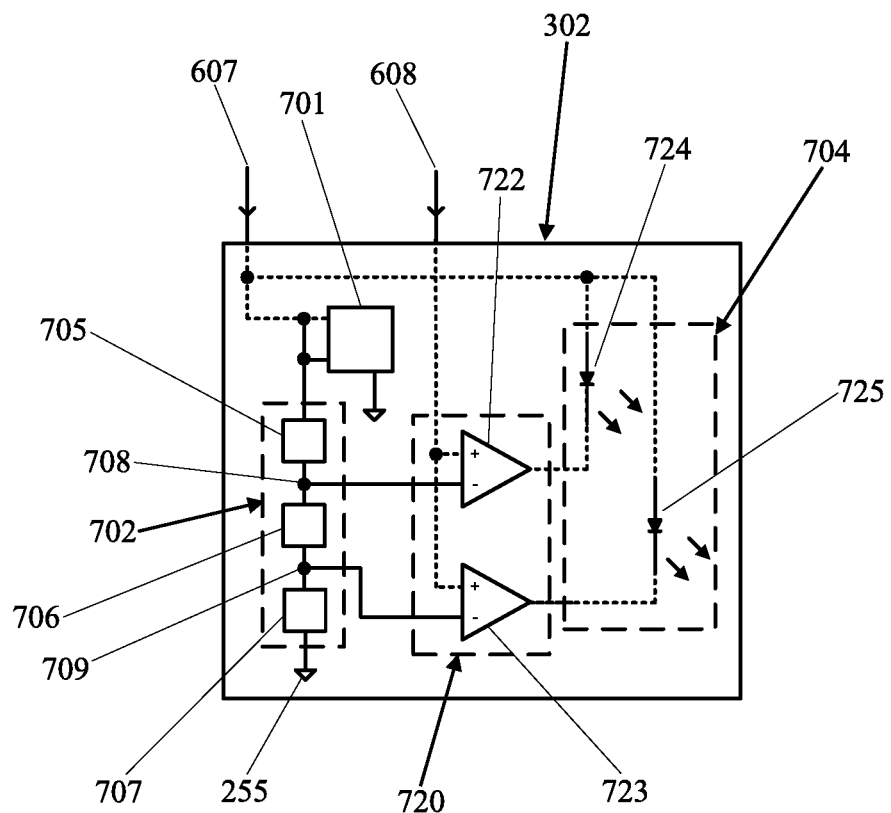
FIG. 4 is an embodiment of a detection circuit according to the present disclosure.

FIG. 4 is an embodiment of a detection circuit according to the present disclosure. The detection circuit 302 comprises a precision voltage regulator 701, a series of voltage dividers 702 coupled to the precision voltage regulator 701, one or more operational amplifiers 720, and one or more LED indicators 704. The precision voltage regulator 701 and the series of the voltage dividers 702 are configured to provide voltage references for the one or more operational amplifiers 720 to test the fourth DC voltage and to identify operational statuses. The series of the voltage dividers 702 comprises one or more resistors 705, 706, and 707 connected in series. At least one of the voltage references 708 is configured for one of the one or more operational amplifiers 722, to identify if charging of the rechargeable battery 500 is normal. At least one of the one or more LED indicators 724 is configured to be lighted up to indicate such a normal status. The at least one of the one or more LED indicators 724 is further configured to be shut off to indicate that the rechargeable battery 500 is fully charged. At least another one of the voltage references 709 is configured for another one of the one or more operational amplifiers 723 to identify if charging of the rechargeable battery 500 is abnormal. Another one of the one or more LED indicators 725 is configured to be lighted up to indicate such an abnormal status.

Whereas preferred embodiments of the present disclosure have been shown and described, it will be realized that alterations, modifications, and improvements may be made thereto without departing from the scope of the following claims. Another kind of schemes with a stand-alone test capability adopted in an LED-based luminaire using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) luminaire, comprising:
at least four electrical conductors configured to couple to alternate-current (AC) mains;
one or more LED arrays with a forward voltage across the one or more LED arrays;
a rechargeable battery;
a first full-wave rectifier and at least one second full-wave rectifier coupled to the at least four electrical conductors and configured to respectively convert a line voltage from the AC mains into a first direct-current (DC) voltage and a second DC voltage;
a first input filter and a second input filter respectively coupled to the first full-wave rectifier and the at least one second full-wave rectifier, the first input filter and the second input filter configured to suppress an electromagnetic interference (EMI) noise;
a charging circuit comprising a first transformer and a first ground reference, the charging circuit coupled to the first full-wave rectifier via the first input filter and configured to convert the first DC voltage into a third DC voltage that charges the rechargeable battery to reach a fourth DC voltage;
a first driver comprising a switch, a dimming controllable device, the first ground reference, an input inductor, at least one diode connected in series with the input inductor, an output resistor, and an output capacitor connected in parallel with the output resistor and connected between the at least one diode and the first ground reference, the first driver configured to convert the fourth DC voltage into a fifth DC voltage to power the one or more LED arrays when the line voltage from the AC mains is unavailable;
a second driver comprising a second transformer, a power sustaining device, and a second ground reference, the second driver coupled to the at least one second full-wave rectifier via the second input filter, the second driver configured to convert the second DC voltage into a sixth DC voltage that powers the one or more LED arrays at full power to meet LED luminaire efficacy requirements when the power sustaining device is enabled to reach an operating voltage to operate the second driver; and
a test and voltage pull-down circuit comprising a voltage pull-down circuit comprising a first voltage pull-down circuit and a second voltage pull-down circuit, the first voltage pull-down circuit configured to either pull down a dimming voltage coupled to the dimming controllable device to disable the first driver when the line voltage from the AC mains is available or to pull up the dimming voltage coupled to the dimming controllable device to enable the first driver when the line voltage from the AC mains is unavailable,
wherein:
the charging circuit, the first driver, the second driver, and the test and voltage pull-down circuit are configured to auto-select either the fifth DC voltage or the sixth DC voltage to operate the one or more LED arrays; and
when a rechargeable battery test is performed, the first driver is enabled to operate the one or more LED arrays, whereas the second driver is inactivated.

2. The LED luminaire of claim 1, wherein the first voltage pull-down circuit comprises an electronic switch and a pull-down resistor connected to the electronic switch, and wherein when the first voltage pull-down circuit receives both the third DC voltage and the fourth DC voltage while the line voltage from the AC mains is available, the electronic switch is turned on, thereby pulling down the dimming voltage.

3. The LED luminaire of claim 2, wherein when the line voltage from the AC mains is unavailable, the electronic switch is turned off, thereby pulling up the dimming voltage.

4. The LED luminaire of claim 2, wherein when the first voltage pull-down circuit receives the fourth DC voltage alone, the electronic switch is turned off, thereby pulling up the dimming voltage.

5. The LED luminaire of claim 2, wherein the electronic switch comprises a silicon-controlled rectifier (SCR), a transistor, a metal-oxide-semiconductor field-effect transistor (MOSFET), or a combination thereof.

6. The LED luminaire of claim 1, wherein the voltage pull-down circuit further comprises a test switch normally electrically open, the test switch configured to pull down an input voltage to the electronic switch when momentarily pressed to be electrically closed, and wherein when the rechargeable battery test is performed with the test switch electrically closed, the input voltage is pulled down with the electronic switch being turned off.

7. The LED luminaire of claim 1, wherein the charging circuit further comprises a first diode connected to the first transformer, wherein the test and voltage pull-down circuit further comprises at least one second diode connected in series with the first diode, wherein the at least one second diode is further connected to the rechargeable battery, a power input of the dimming controllable device, and the test and voltage pull-down circuit, wherein the first diode is further coupled to the first voltage pull-down circuit, and wherein the first diode and the at least one second diode are configured to control a current direction to charge the rechargeable battery, to set up a voltage drop from the third DC voltage to the fourth DC voltage, and to prevent the fourth DC voltage from being messed up with the third DC voltage when the line voltage from the AC mains is unavailable.

8. The LED luminaire of claim 1, wherein the second voltage pull-down circuit comprises an opto-isolator comprising an LED and a photo-transistor, a pull-down resistor connected to the opto-isolator, and the second ground reference, wherein the photo-transistor is connected to the power sustaining device in the second driver, and wherein the photo-transistor is configured to receive an optical signal from the LED and to pull down the operating voltage on the power sustaining device to the second ground reference, thereby disabling the second driver when the rechargeable battery test is performed.

9. The LED luminaire of claim 1, wherein the test and voltage pull-down circuit further comprises at least one pair of electrical contacts configured to electrically couple the rechargeable battery to the charging circuit, the first driver, and the test and voltage pull-down circuit and to operate thereof.

10. The LED luminaire of claim 9, wherein the at least one pair of electrical contacts comprise electrical contacts in a switch, a relay, and a jumper, or electrical terminals accommodated for jumper wires.

11. The LED luminaire of claim 1, wherein the voltage pull-down circuit further comprises a detection circuit comprising a precision voltage regulator, a series of voltage dividers coupled to the precision voltage regulator, one or more operational amplifiers, and one or more LED indicators, and wherein the precision voltage regulator and the series of the voltage dividers are configured to provide voltage references for the one or more operational amplifiers to test the fourth DC voltage and to identify operational statuses.

12. The LED luminaire of claim 11, wherein the series of the voltage dividers comprises one or more resistors connected in series, wherein at least one of the voltage references is configured for one of the one or more operational amplifiers to identify if charging of the rechargeable battery is normal, and wherein at least one of the one or more LED indicators is configured to be lighted up to indicate such a normal status.

13. The LED luminaire of claim 12, wherein the at least one of the one or more LED indicators is further configured to be shut off to indicate that the rechargeable battery is fully charged.

14. The LED luminaire of claim 11, wherein at least another one of the voltage references is configured for another one of the one or more operational amplifiers to identify if charging of the rechargeable battery is abnormal, and wherein another one of the one or more LED indicators is configured to be lighted up to indicate such an abnormal status.

15. The LED luminaire of claim 1, wherein the first driver is a step-up converter with the fifth DC voltage higher than both the fourth DC voltage and the forward voltage across the one or more LED arrays to operate the one or more LED arrays without flickering.

16. The LED luminaire of claim 1, wherein the first driver further comprises one or more current sensing resistors coupled in series with the switch in the first driver, the one or more current sensing resistors and the switch configured to control charging and discharging of the input inductor, subsequently controlling an output current to operate the one or more LED arrays such that the one or more LED arrays consume less power when the line voltage from the AC mains is unavailable than the one or more LED arrays do when the line voltage from the AC mains is available.

17. The LED luminaire of claim 1, wherein the charging circuit is a first step-down converter with the third DC voltage lower than the first DC voltage but higher than both a rated voltage of the rechargeable battery and the fourth DC voltage.

18. The LED luminaire of claim 1, wherein the second driver is a second step-down converter with the sixth DC voltage lower than the second DC voltage but higher than the forward voltage across the one or more LED arrays.

19. The LED luminaire of claim 1, wherein the at least four electrical conductors comprise two sets of electrical conductors and wherein each of the first full-wave rectifier and the at least one second full-wave rectifier is respectively coupled to one of the two sets of electrical conductors.

20. The LED luminaire of claim 19, wherein when only one of the first full-wave rectifier or the at least one second full-wave rectifier is energized by the line voltage from the AC mains connected to one of the two sets of electrical conductors, the other one of the two sets of electrical conductors do not conduct electric current, thus no electric shock hazard possibly occurred.

* * * * *